United States Patent
Shiga et al.

[11] Patent Number: 6,056,224
[45] Date of Patent: May 2, 2000

[54] MAGNETIC TAPE CASSETTE

[75] Inventors: Hideaki Shiga; Daisuke Takahashi, both of Kanagawa-ken, Japan

[73] Assignee: Fuji Photo Film Co., Ltd., Kanagawa-ken, Japan

[21] Appl. No.: 09/150,895

[22] Filed: Sep. 10, 1998

[30] Foreign Application Priority Data

Sep. 11, 1997 [JP] Japan ..................................... 9-246511

[51] Int. Cl.[7] .................................................. G03B 23/02
[52] U.S. Cl. .................................... 242/338.2; 242/347.1; 360/132
[58] Field of Search ................................ 242/338, 338.1, 242/338.2, 347, 347.1; 360/132

[56] References Cited

U.S. PATENT DOCUMENTS

| | | | |
|---|---|---|---|
| Re. 34,927 | 5/1995 | Meguro et al. ..................... | 360/132 X |
| 4,660,784 | 4/1987 | Sumida et al. . | |
| 4,673,145 | 6/1987 | Emori .................................. | 360/132 X |
| 4,743,992 | 5/1988 | Komiyama et al. ................. | 360/132 |
| 4,775,911 | 10/1988 | Sato et al. ............................ | 360/132 |
| 4,847,717 | 7/1989 | Satoh et al. ......................... | 360/132 |
| 4,905,113 | 2/1990 | Shiba et al. ......................... | 360/132 |
| 5,144,511 | 9/1992 | Katagiri et al. ..................... | 360/132 |
| 5,173,829 | 12/1992 | Kawaguchi et al. ................. | 360/132 |

FOREIGN PATENT DOCUMENTS

| | | | |
|---|---|---|---|
| 2 644 278 | 3/1990 | France ........................... | G11B 23/06 |
| 60-129985 | 7/1985 | Japan ............................ | G11B 23/087 |
| 60-136078 | 7/1985 | Japan ............................ | G11B 23/087 |
| 60-136079 | 7/1985 | Japan ............................ | G11B 23/087 |
| 60-175271 | 9/1985 | Japan ............................ | G11B 23/087 |
| 7-169234 | 7/1995 | Japan ............................ | G11B 23/087 |
| 7-282561 | 10/1995 | Japan ............................ | G11B 23/087 |
| 2 150 916 | 7/1985 | United Kingdom ........... | G11B 15/08 |
| 2243821 | 11/1991 | United Kingdom ........... | 242/347.1 |

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A magnetic tape cassette has a casing body which contains a magnetic tape and is provided in the bottom thereof with an opening through which a tape loading mechanism of a recording and reproducing system is inserted into the casing body, and a slider provided opposed to the lower surface of the casing body to be slidable in the direction of loading of the magnetic tape cassette between a closing position where it closes the opening and an opening position where it opens the opening. A resilient locking piece is provided on the bottom of the casing body and a pair of through holes which are brought into engagement with the resilient locking piece respectively in the closing position and the opening position of the slider to lock the slider there is provided on the slider. A guide channel is formed on the side of the slider remote from the casing body to extend in the direction of loading of the cassette in order to guide a lock release member of the recording and reproducing system to disengage the locking piece from the through hole. An elevated area is formed on the slider facing and in sliding contact with the lower surface of the casing body. The elevated area is formed so as to surround the area corresponding to the guide channel and extends from the front end of the slider to or short of the middle between the ends of the slider.

10 Claims, 5 Drawing Sheets

F I G. 7
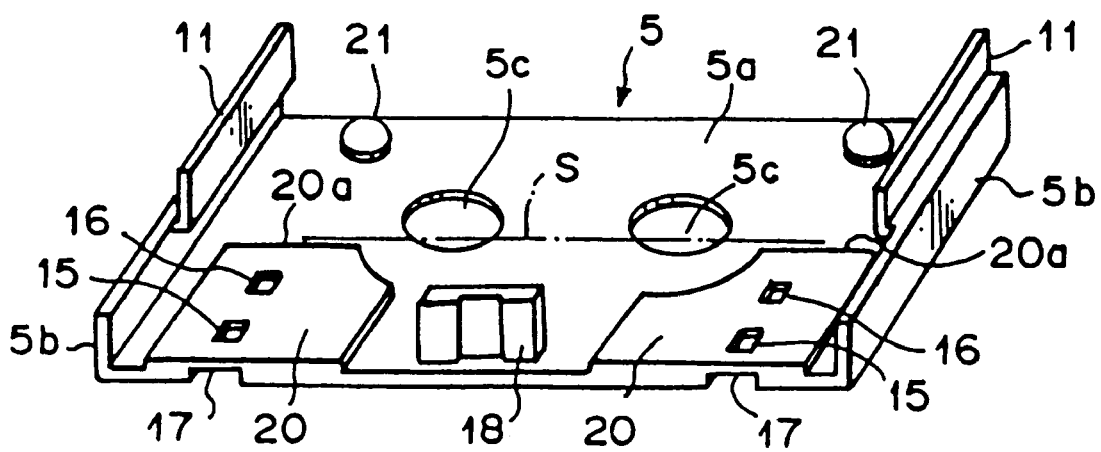
PRIOR ART

PRIOR ART

MAGNETIC TAPE CASSETTE

BACKGROUND OF THE INVENTION

1. Field of the Invention

This invention relates to a magnetic tape cassette in which an opening through which a tape loading mechanism of a recording and reproducing system is inserted into the cassette body is formed in the bottom of the casing and a slider is provided to be slid back and forth to open and close the opening, and more particularly to the structure of the slider.

2. Description of the Related Art

In such a magnetic tape cassette, a pair of hubs around which a magnetic tape is wound are contained in a casing body spaced from each other in a direction transverse to the direction of loading of the magnetic tape cassette into a recording and reproducing system, and an opening which gives a tape loading mechanism of the recording and reproducing system access to the tape is formed in the bottom of the casing body at the front end portion thereof. In order to prevent entrance of dust and/or other foreign matters into the casing body through the opening, a slider is provided to be slid back and forth along the bottom of the casing body in the direction of loading to open and close the opening.

Mechanisms for opening the slider in response to loading the magnetic tape cassette into the recording and reproducing system and closing the slider in response to unloading the cassette from the system are disclosed, for instance, in Japanese Unexamined Patent Publication Nos. 60(1985)-129985, 60(1985)-136078, 60(1985)-136079 and 60(1985)-175271.

When the slider is in contact with the bottom surface of the casing body over the entire area thereof, slight manufacturing errors, internal strains or thermal deformation can result in an excessive sliding resistance, which can cause failure in action of the slider. In order to overcome this problem, there has been developed a technique in which ribs are formed on the surface of the slider to extend in the direction of loading so that the slider is in contact with the bottom surface of the casing body only at the ribs. See, for instance, U.S. Pat. No. 4,660,784. Further in the known technique, a locking mechanism for locking the slider in its closing position and opening position is provided and a channel for guiding a lock release member which releases the lock is formed on the bottom surface of the slider.

FIG. 8 shows a slider 5 in the tape cassette of the prior art. As shown in FIG. 8, the slider 5 is provided on its upper surface with a pair of protrusions 220 which are in a sliding contact with the lower surface of a lower casing half 3 (FIG. 1) of a casing body 1 (to be described later). The protrusions 220 extend over the entire length of the slider 5 from the front end to the rear end of the slider 5. Each protrusion 220 is provided with through holes 15 and 16 which are selectively brought into engagement with a resilient locking piece on the casing body 1 in the closing position and the opening position of the slider 5. A guide channel 17 for guiding a lock release member which disengages the locking piece from the through holes 15 and 16 to release the lock is formed on the lower side of each protrusion 220. The other elements of the slider 5 shown in FIG. 8 are given the same reference numerals as in FIG. 1 which will be described later, and will not be described here.

However the slider of the prior art is disadvantageous in that due to the guide channel formed in the protrusion, a thick wall portion and a thin wall. portion are formed side by side, which is apt to cause warpage in a molded slider and deteriorate the dimensional accuracy, thereby causing various drawbacks.

That is, the part of the protrusion where the guide channel is formed is smaller in wall thickness than the parts on opposite sides of the channel and accordingly resin cannot smoothly flow into the cavity portion of the mold corresponding to the part, which often results in warpage, local deformation and/or surface defects such as failure in transfer of a grain pattern, weldline, irregularity in surface appearance, sink marks and the like.

Further when the protrusions extend over the entire length of the slider, a foreign matter caught between the protrusion and the casing body cannot be discharged since the direction and length of the sliding action of the slider are constant and keeps obstructing sliding action of the slider for a long time.

SUMMARY OF THE INVENTION

In view of the foregoing observations and description, the primary object of the present invention is to provide a magnetic tape cassette in which the slider is free from deformation and is excellent in dimensional accuracy, whereby the slider can be slid with a high reliability.

In accordance with the present invention, there is provided a magnetic tape cassette comprising a casing body which contains a magnetic tape and is provided in the bottom thereof with an opening through which a tape loading mechanism of a recording and/or reproducing system is inserted into the casing body, and a slider provided opposed to the lower surface of the bottom of the casing body to be slidable back and forth in the direction of loading of the magnetic tape cassette into the recording and/or reproducing system between a closing position where it closes the opening and an opening position where it opens the opening, a resilient locking piece having an engagement head which is rotatable up and down being provided on the bottom of the casing body, a pair of through holes which are brought into engagement with the engagement head of the resilient locking piece respectively in the closing position and the opening position of the slider to lock the slider there being provided on the slider, and a guide channel substantially rectangular in cross-section being formed on the side of the slider remote from the casing body to extend in the direction of loading of the cassette in order to guide a lock release member of the recording and/or reproducing system to abut against the engagement head of the locking piece to disengage the engagement head from the through hole, wherein the improvement comprises that an elevated area is formed on the surface of the slider facing the casing body and in sliding contact with the lower surface of the bottom of the casing body, the elevated area being formed so as to surround the area corresponding to the guide channel and extending from the end of the slider near the opening of the casing body toward the other end to or short of the middle between the ends of the slider.

It is preferred that the elevated area be arcuate in contour. An auxiliary projection may be formed on the slider at a portion spaced rearward from the elevated area in the direction of loading. Further, one or more recesses may be formed in the elevated area in order to reduce the contact area between the elevated portion and the lower surface of the bottom of the casing body.

In the magnetic tape cassette of the present invention, since the elevated area does not extend beyond the middle of the slider, resin can smoothly flow in the cavity portion of the mold forming the guide channel and the part around the channel and warpage of the molded slider can be suppressed, whereby a slider which is better in dimensional accuracy can be obtained and accordingly sliding action of the slider is stabilized.

Further since a molding fault is less apt to be caused, a magnetic tape cassette which is free from surface defect and is high in commercial value can be obtained. Further a foreign matter caught between the elevated area and the casing body can be positively discharged and stable sliding action of the slider can be held for a long time.

When the elevated area is arcuate in contour, a molding fault is further less apt to be caused and the foreign matter is better discharged.

BRIEF DESCRIPTION OF THE DRAWINGS

FIG. 7 is a perspective view of the slider of the magnetic tape cassette in accordance with another embodiment of the present invention.

DESCRIPTION OF THE PREFERRED EMBODIMENTS

Figure 1:
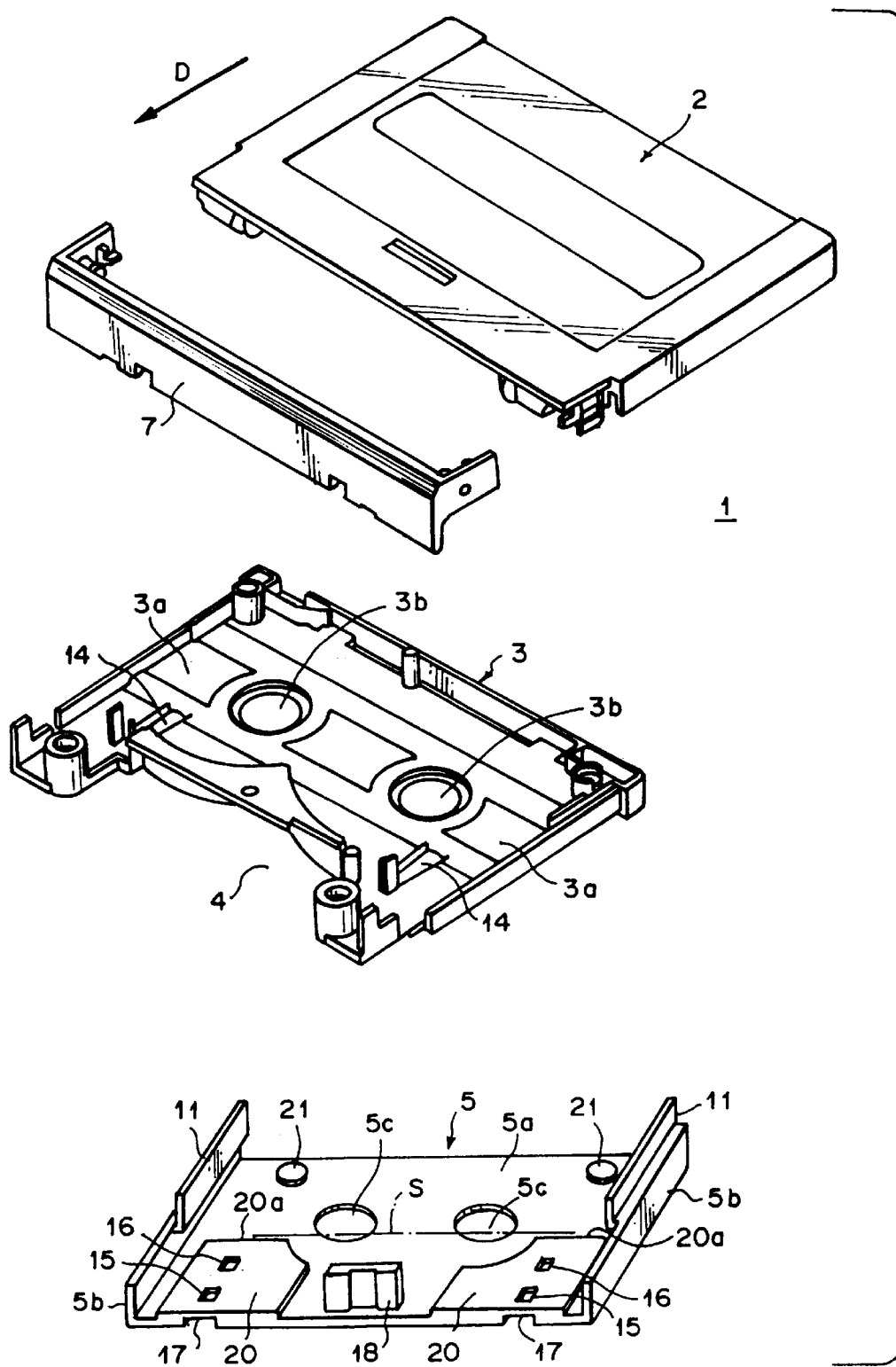
FIG. 1 is a schematic exploded perspective view of a magnetic tape cassette in accordance with an embodiment of the present invention.
Figure 2:
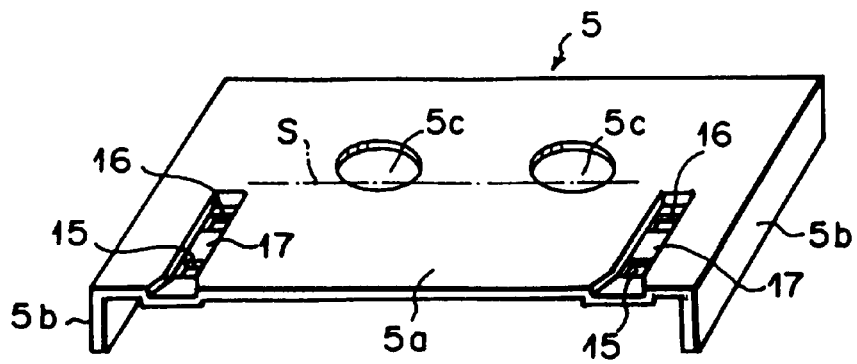
FIG. 2 is a perspective view of the slider of the cassette shown in FIG. 1.
Figure 3:
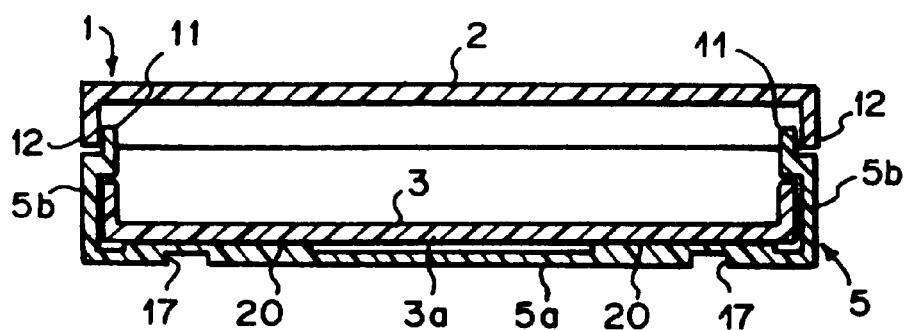
FIG. 3 is a cross-sectional view showing the casing body and the slider assembled together.

In FIGS. 1 to 3, a magnetic tape cassette in accordance with an embodiment of the present invention comprises a thin box-like casing body 1 and a slider 5 mounted on the lower side of the casing body 1 to be slidable back and forth in the direction D of loading of the cassette into a recording and reproducing system. The casing body 1 is formed of an upper casing half 2 and a lower casing half 3 mated together.

A pair of hubs (not shown) around which a magnetic tape is wound are contained in the casing body 1 spaced from each other in a direction transverse to the direction D of loading, and an opening 4 which gives a tape loading mechanism of the recording and reproducing system access to the tape is formed in the bottom 3a (formed by the lower casing half 3) of the casing body 1 at the front end portion thereof. The casing body 1 is open at the front end face and a front lid 7 is mounted to be rotatable up and down between a closing position where it closes the front end face of the casing body 1 and an opening position where it opens the front end face of the casing body 1. The front lid 7 is moved to the opening position in response to loading the magnetic tape cassette to the recording and reproducing system and returned to the closing position in response to unloading the cassette.

The tape loading mechanism of the recording and reproducing system is inserted from below into the casing body 1 through the opening 4 and draws out the tape through the front end face of the casing body 1 for recording or reproduction. A pair of spindle holes 3b are formed in the lower casing half 3 and drive spindles of the recording and reproducing system are inserted into the casing body 1 to be brought into engagement with the hubs.

The slider 5 is slid back and forth in the direction D of loading between a closing position where it closes the opening 4 and an opening position where it opens the opening 4. The slider 5 is formed by synthetic resin molding and comprises a flat plate portion 5a and opposite side wall portions 5b erected from the flat plate portion 5a at opposite sides thereof.

A retainer portion 11 extends upward from each side wall portion 5b and is inserted into a slit 12 formed between the upper and lower casing halves 2 and 3, whereby the slider 5 is slidable relative to the casing body 1 and at the same time the distance of sliding motion of the slider 5 is limited to the length of the slit 12.

The flat plate portion 5a of the slider 5 is smaller than the casing body 1 in the length measured in the direction D. When the slider 5 is in the closing position the front end face of the slider 5 is in alignment with the front end face of the casing body 1. When the slider 5 is moved rearward to the opening position, the opening 4 is full opened. The slider 5 is provided with a pair of spindle holes 5c which are aligned with the spindle holes 3b in the casing body 1 when the slider 5 is in the opening position. The spindle holes 5c are formed so that their centers are positioned rearward of the middle S between the ends of the slider 5.

The slider 5 is locked in the closing position and the opening position by a locking mechanism. The locking mechanism comprises a pair of resilient locking pieces 14 formed on the casing body 1 (on the lower surface 3a of the lower casing half 3) integrally therewith and a pair of front through holes 15 and a pair of rear through holes 16 formed on the slider 5.

Figure 4B:
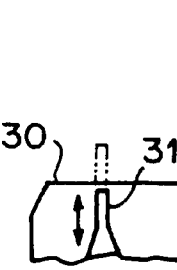
FIG. 4B is a view showing a lock release member of a recording and reproducing system.
Figure 4A:
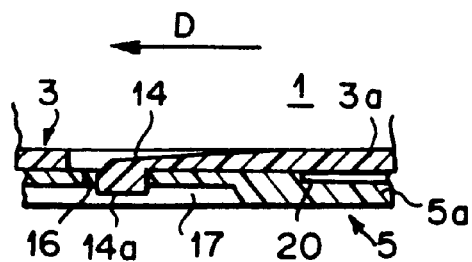
FIG. 4A is an enlarged fragmentary cross-sectional view showing the resilient locking piece in engagement with the through hole.

As shown in FIG. 4A, the locking piece 14 is connected to the lower casing half 3 at its base end and is resiliently deformable. A hook-like engagement head 14a is formed on the free end of the locking piece 14 and is directed downward. The engagement head 14a projects downward beyond the lower surface 3a of the lower casing half 3 to be brought into engagement with the through holes 15 and 16.

The through holes 15 and 16 are rectangular in shape and are formed each pair on each side of the slider 5. Each front through hole 15 is brought into engagement with the engagement head 14a to lock the slider 5 in the opening position when the slider 5 is moved rearward relative to the casing body 1 to the opening position and each rear through hole 16 is brought into engagement with the engagement head 14a to lock the slider 5 in the closing position when the slider 5 is moved forward to the closing position.

The engagement head 14a is disengaged from the through holes 15 and 16 by a lift piece 31 (FIG. 4B) of a lock release member 30 provided in the recording and. reproducing system. The lock release member 30 is guided by a guide channel 17 which is substantially square in cross-section and formed in the lower side of the slider 5 and is brought into alignment with the through hole 15 or 16 opening in the channel 17. In the position where the lock release member 30 is in alignment with the through hole 15 or 16, the lift piece 31 is moved upward to push the engagement head 14a of the resilient locking piece 14 in engagement with the through hole, thereby disengaging the engagement head 14a from the through hole. The front end portion of the guide channel 17 is flared forward.

The guide channel 17 extends in the direction D of loading the cassette into the recording and reproducing system and the longitudinal axis of the guide channel 17 is substantially in alignment with the longitudinal axis of the resilient locking piece 14. The rear end of the guide channel 17 is positioned forward of the centers of the spindle holes 5c, and in this particular embodiment forward of the middle S between the ends of the slider 5.

A pair of elevated areas 20 are formed on the upper surface of the flat plate portion 5a of the slider 5 facing the lower surface 3a of the casing body 1 and in sliding contact with the lower surface 3a of the casing body 1. Each elevated area 20 is formed so as to surround the area corresponding to the guide channel 17 including the through holes 15 and 16.

The elevated areas 20 extend from the front end of the slider 5 toward the rear end to or short of the middle S between the ends of the slider 5.

The wall thickness of the flat plate portion 5a of the slider 5 is thicker in the elevated areas 20 than the other portion except the portions where the guide channels 17 are formed.

The engagement heads 14a of the resilient locking pieces 14 are positioned in the guide channels 17 without projecting beyond the lower surface of the slider 5.

A spring retainer portion 18 for holding a spring (not shown) for urging the slider 5 toward the closing position is formed on the slider at the center of the front end portion thereof. A gate of the injection mold for molding the slider 5 is formed in the cavity portion forming the spring retainer portion 18.

A pair of auxiliary projections 21 whose top surfaces are at substantially the same level as the top surfaces of the elevated areas 20 are formed on the right and left sides of the slider 5 near the rear end thereof. The auxiliary projections 21 are for preventing the slider 5 from chattering during sliding. The top surface of each auxiliary projection may be, for instance, flat or spherical (see FIG. 7). The height of the elevated areas 20 front the upper surface of the flat plate portion 5a may be, for instance, 0.05 to 0.3 mm.

In the magnetic tape cassette, the slider 5 is locked in the closing position with the engagement heads 14a of the resilient locking pieces 14 in engagement with the rear through holes 16 before it is loaded into the recording and reproducing system.

As the magnetic tape cassette is loaded into the recording and reproducing system, the lock release member 30 is inserted into each guide channel 17 from the flared front end portion of the channel 17 and disengages the engagement head 14a from the rear through hole 16 by operation of the lift piece 31, thereby permitting sliding motion of the slider 5. Then as the magnetic tape cassette is further inserted into the system, the slider 5 is moved rearward relative to the casing body 1 to the opening position and the front through hole 15 is brought into engagement with the engagement head 14a, thereby locking the slider 5 in the opening position. The tape loading mechanism of the recording and reproducing system is inserted into the casing body 1 through the opening 4 and draws out the tape forward. Thus recording or reproduction becomes feasible.

When taking out the cassette, the lock release member 30 is moved forward to disengage the engagement head 14a of the resilient locking piece 14 from the front through hole 15 to permit the slider 5 to return to the closing position under the force of the spring. In the sliding motion described above, by virtue of the elevated areas 20 and the auxiliary projections 21, the slider 5 can be smoothly slid.

Further the arrangement of the elevated areas 20 avoids the problems in molding the slider 5 such as warpage of the slider 5. That is, the resin injected into the cavity of the mold through the gate formed in the cavity portion forming the spring retainer portion 18 goes round the cavity portions for forming the guide channels 17, which are narrow. However since the rear part of the slider 5 is provided with no elevated area and is thinner than the front part, that is, since the cavity portion for forming the rear part is narrower than the cavity portion forming the elevated areas, the injected resin smoothly fills the cavity portions for forming the guide channels 17 earlier than the cavity portion for forming the rear part. Thus a molding defect due to short molding or strain can be avoided.

If the elevated areas 20 extend into the rear part of the slider 5, the injected resin goes round the cavity portions forming the channels 17, which is narrow, to first fill the cavity portions forming the elevated areas 20 and to fill the cavity portions forming the channels 17 at the final stage of injection, whereby strain is concentrated in the portion of the molded slider around the guide channels 17. Accordingly, warpage, local deformation and/or surface defects such as failure in transfer of a grain pattern, weldline, irregularity in surface appearance, sink marks and the like are apt to be generated. To the contrast, in the slider 5 of this embodiment, since the elevated areas 20 are only in the front part, the narrow cavity portions forming the guide channels 17 are filled with resin in a relatively early stage of injection and accordingly a molding defect is less apt to be generated.

Figure 5:
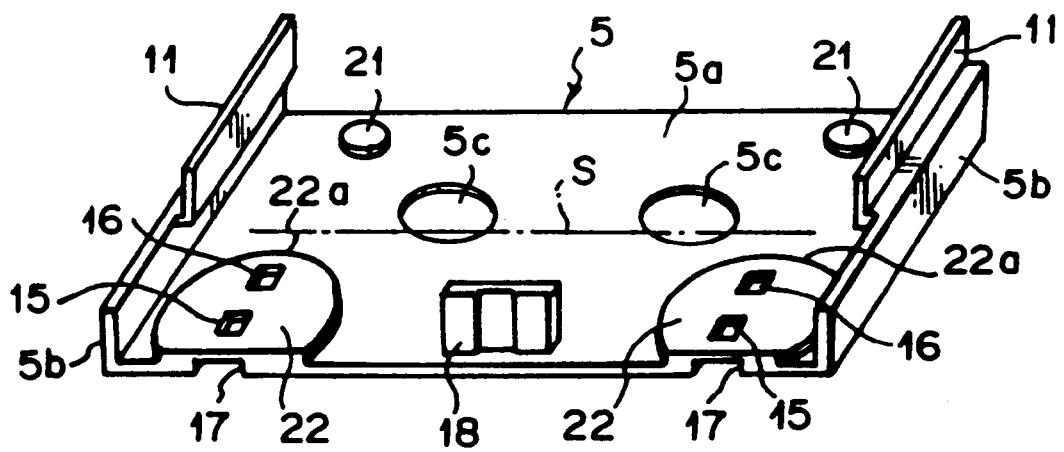
FIG. 5 is a perspective view of the slider of a magnetic tape cassette in accordance with another embodiment of the present invention.

In another embodiment shown in FIG. 5, elevated areas 22 have arcuate contours 22a. With this arrangement, foreign matters entering the elevated areas 22 and the portion therearound can be positively discharged from the sliding range of the elevated areas 22a.

Figure 6:
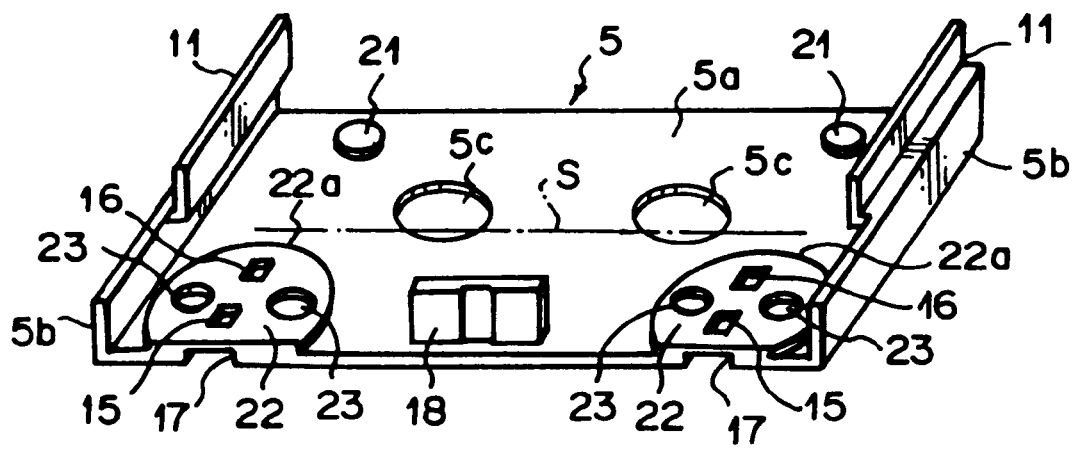
FIG. 6 is a perspective view of the slider of a magnetic tape cassette in accordance with still another embodiment of the present invention.
Figure 8:
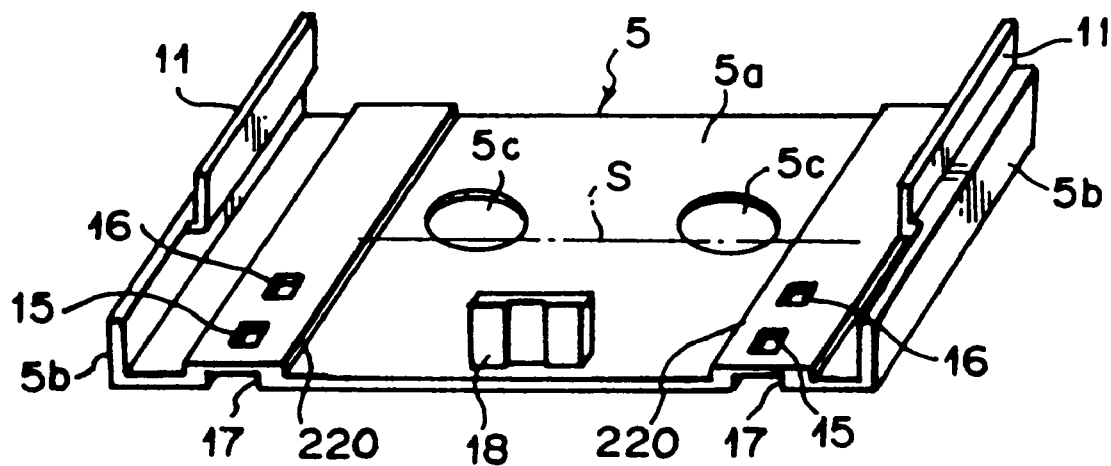
FIG. 8 is a perspective view of the slider of a magnetic tape cassette in accordance with a prior art.

In still another embodiment shown in FIG. 6, recesses 23 are formed in the elevated areas 22. The recesses 23 reduce the contact area between the elevated areas 22 and the lower surface 3a of the casing body 1, thereby reducing the sliding resistance.

What is claimed is:

1. A magnetic tape cassette comprising:
   a casing body which contains a magnetic tape and is provided in a bottom thereof with an opening through which a tape loading mechanism of at least one of a recording and reproducing system is inserted into the casing body, and
   a slider provided opposed to a lower surface of the bottom of the casing body to be slidable back and forth in a direction of loading of the magnetic tape cassette into the recording and reproducing system between a closing position where it closes the opening and an opening position where it opens the opening,
   said casing body including a resilient locking piece having an engagement head which is rotatable up and down on the bottom of the casing body, and
   said slider including:
      a pair of through holes which are brought into engagement with the engagement head of the resilient locking piece respectively in the closing position and the opening position of the slider, to lock the slider,
      a guide channel substantially rectangular in cross-section being formed on a side of the slider remote from the casing body to extend in the direction of loading of the cassette and adapted to guide a lock release member of the recording and reproducing system to abut against the engagement head of the locking piece to disengage the engagement head of the locking piece from one of the pair of through holes, and an elevated area formed on a surface of the slider facing the casing body and in sliding contact with a lower surface of the bottom of the casing body, the elevated area being formed so as to surround an area corresponding to the guide channel and extending from one end of the slider near the opening of the casing body no more than halfway toward the other end of the slider, said elevated area having an arcuate portion.

2. A magnetic tape cassette as defined in claim 1 in which the elevated area within said slider is entirely arcuate in contour.

3. A magnetic tape cassette as defined in claim 1 further comprising at least one recess formed in the elevated area.

4. A magnetic tape cassette as defined in claim 1 in which a longitudinal axis of the guide channel is substantially in alignment with a longitudinal axis of the resilient locking piece.

5. A magnetic tape cassette as defined in claim 1, said slider further comprising a pair of spindle holes having centers, and wherein a rear end of the guide channel is positioned forward of the centers of the spindle holes.

6. A magnetic tape cassette as defined in claim 5, in which the rear end of the guide channel is positioned forward of a halfway point between the ends of the slider.

7. A magnetic tape cassette as defined in claim 1 in which the engagement head of the resilient locking piece is positioned in the guide channel without projecting beyond the lower surface of the slider.

8. A magnetic tape cassette as defined in claim 1 in which a height of the elevated area from the surface of the slider facing the casing body is 0.05 to 0.3 mm.

9. A magnetic tape cassette comprising:

a casing body which contains a magnetic tape and is provided in a bottom thereof with an opening through which a tape loading mechanism of at least one of a recording and reproducing system is inserted into the casing body, and a slider provided opposed to a lower surface of the bottom of the casing body to be slidable back and forth in a direction of loading of the magnetic tape cassette into the recording and reproducing system between a closing position where it closes the opening and an opening position where it opens the opening, said casing body including a resilient locking piece having an engagement head which is rotatable up and down on the bottom of the casing body, and said slider including:

a pair of through holes which are brought into engagement with the engagement head of the resilient locking piece respectively in the closing position and the opening position of the sliders to lock the slider, a guide channel substantially rectangular in cross-section being formed on a side of the slider remote from the casing body to extend in the direction of loading of the cassette and adapted to guide a lock release member of the recording and reproducing system to abut against the engagement head of the locking piece to disengage the engagement head of the locking piece from one of the pair of through holes, an elevated area formed on a surface of the slider facing the casing body and in sliding contact with a lower surface of the bottom of the casing body, the elevated area being formed so as to surround an area corresponding to the guide channel and extending from one end of the slider near the opening of the casing body no more than halfway toward the other end of the slider, and an auxiliary projection formed at a portion spaced rearward from the elevated area.

10. A magnetic tape cassette as defined in claim 9 in which a top surface of the auxiliary projection is one of flat and spherical.

* * * * *